Figure 1:
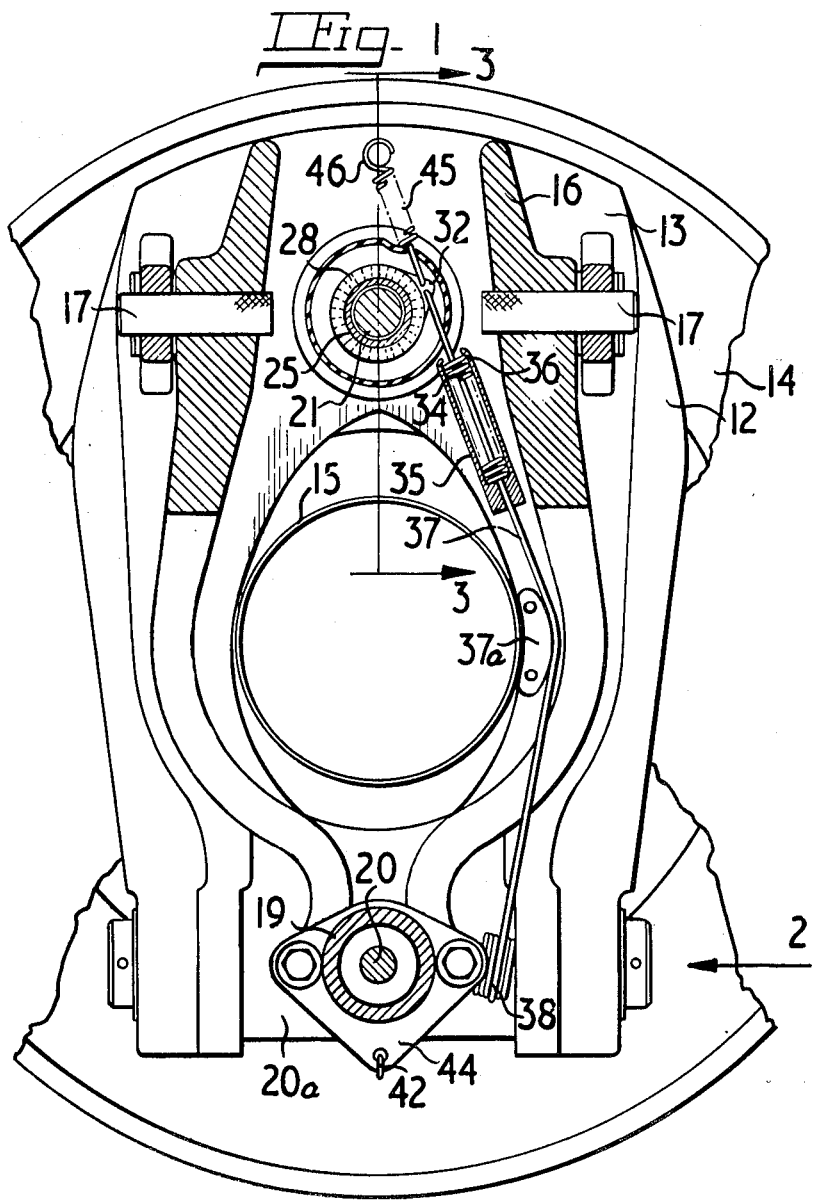

United States Patent Office 3,237,730
Patented Mar. 1, 1966

3,237,730
AUTOMATIC SCREW ADJUSTER
Roy Ernest Edwards, Blackheath, Birmingham, England, assignor to Girling Limited, Birmingham, England, a British company
Filed Dec. 16, 1963, Ser. No. 331,348
Claims priority, application Great Britain, Dec. 14, 1962, 47,368/62
5 Claims. (Cl. 188—196)

This invention relates to automatic adjusters for use in brakes of the type in which movable brake members are adapted to be applied to a rotating drum or disc. It is desirable to arrange for the adjuster to be operated on actuation of the brake and to adjust the positions of the movable brake member to take up any excess clearance occasioned by wear of the braking surfaces. Any adjusting movement which occurs ceases when the movable braking members come into contact with the disc because of the large reaction forces developed, and since the adjusting means may continue to respond to resilient deflection of the brake mechanism under the high actuating forces applied, the adjuster may become strained or buckled unless some yieldable force limiting means are included in its linkage.

According to the invention we now propose an automatic adjuster adapted to act upon screw adjusting means in a brake and adjust the relative positions of braking surfaces, in which are included, at a point remote from the screw adjusting means, resiliently yieldable means adapted to transmit an adjusting force to the screw adjusting means and to yield resiliently when this force exceeds a predetermined value. In a lever operated disc brake comprising a brake disc and two brake pads adapted to be applied to opposite sides of a short peripheral length of the disc by an actuator and incorporating the automatic adjuster which is adapted to respond to movement of the actuating member in the brake applying direction to adjust the position of the brake pads when the clearance between the pads and the disc exceeds a predetermined value, resiliently yieldable means are incorporated in the adjuster and are adapted to yield on further movement of the actuating member after the brake pads have been applied to the disc.

Preferably the actuating member comprises a pivoted actuating lever and the yieldable spring means comprise a pre-loaded spring arranged to transmit the adjusting force and to yield resiliently when this force exceeds a predetermined value. The adjuster responds to pivotal movement of the actuating lever until the brake pads contact the disc and applies an adjusting force to screw adjusting means to take up any excess clearance of the brake pads. The reaction forces produced when the brake pads engage the disc lock the screw adjusting means and any further response of the adjuster, for example on resilient deflection of the actuating lever under the actuating force, causes yielding of the pre-loaded spring.

Figure 2:
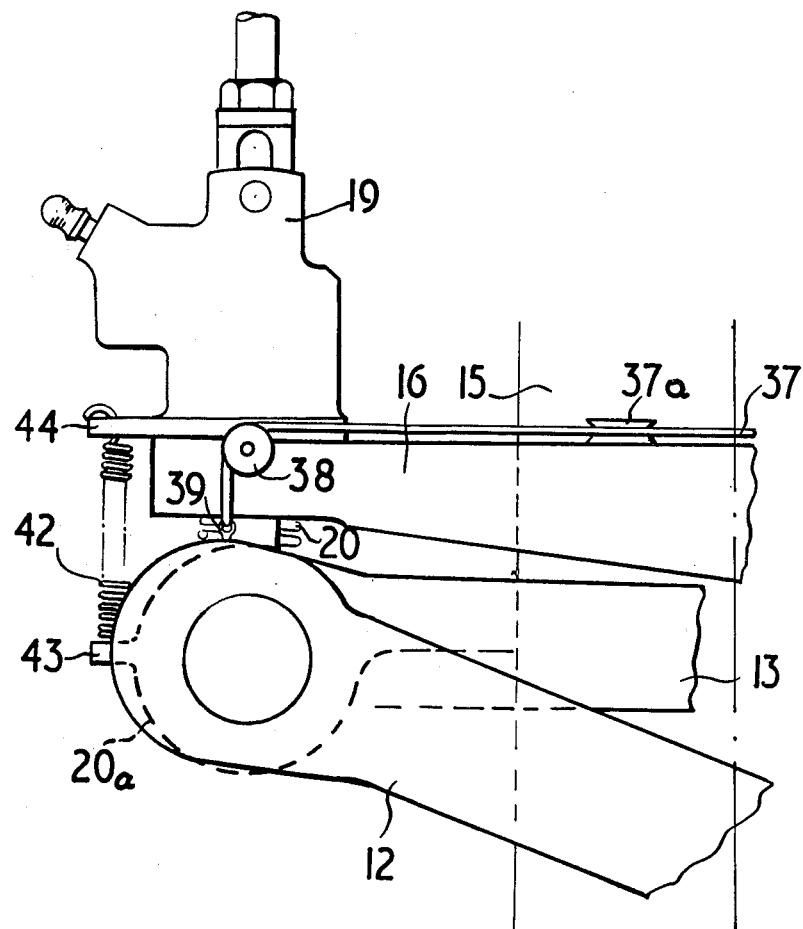
Figure 3:
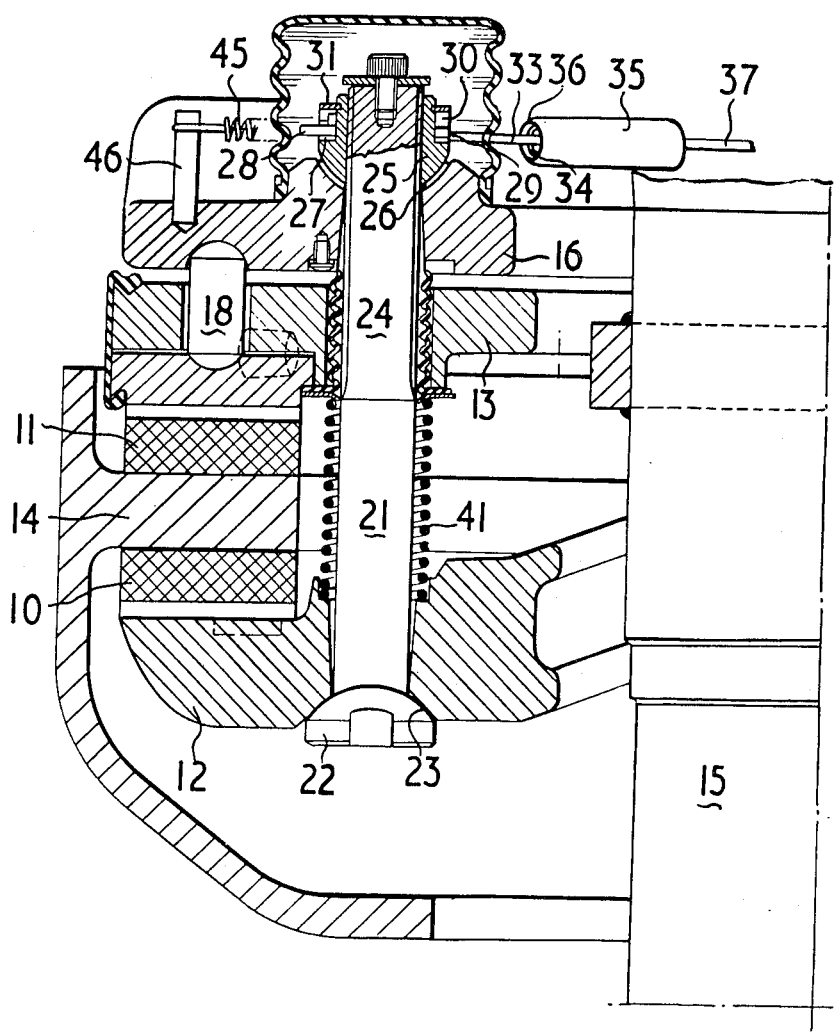

In order that the invention may more clearly be understood it will now be described by way of example only, with reference to the embodiment illustrated in the accompanying drawings in which:

FIGURE 1 is a fragmentary elevation partly in section of a lever type disc brake provided with an automatic adjuster according to the invention, FIGURE 2 is a fragmentary end view to a larger scale in the direction of the arrow 2 of the brake shown in FIGURE 1, and FIGURE 3 is a fragmentary section view to a larger scale taken on the line 3—3 in FIGURE 1.

In the brake shown brake pads 10, 11 are carried on a pivotal reaction lever 12 and a pivoted servo lever 13 respectively and are arranged to apply a braking torque to a disc or ring 14 rotating about an axle 15. An actuating lever 16 pivoted on pins 17 on the servo lever is arranged to apply the pad 11 to the disc by means of a short strut 18 on operation of a hydraulic cylinder 19. Extending from the cylinder 19 is a piston rod 20 which engages a boss 20a, fixed relative to the axle, so that actuation of the hydraulic cylinder 19 causes the lever 16 to pivot on the pins 17 and apply the pad 11 to the disc.

The reaction lever and the servo lever are interconnected by means of a pull rod or bolt 21 having a part-spherical head 22 engaging a similarly shaped seat 23 in the reaction lever, the bolt being formed with a screw-threaded portion 24 engaged by a part-spherical nut 25 co-operating with a suitable seating 26 on the actuating lever 16. The center of curvature of the seating 26 lies on the pivotal axis of the actuating lever on the servo lever so that the reaction forces on one brake pad act to apply the other pad.

The clearance between the brake pads and the disc can be adjusted by rotation of the nut 25 and the automatic adjuster is arranged to maintain this clearance within a pre-determined limit. The nut 25 is formed with ratchet teeth 27 in a plane normal to its axis and these are engaged by the mating teeth on a flat face pawl 28 carried on a shoulder 29 of the nut. The face pawl is urged into engagement with the ratchet 27 by a number of spring fingers 30 formed on an annular spring steel ring 31 carried in a groove on the shoulder of the nut. The pawl is adapted to drive the nut in a direction in which it moves axially towards the bolt head 22 (clockwise as seen in FIGURE 1).

The face pawl 28 is formed on one side with an extended flange portion 32 to which is connected one end of a flexible element or cable 33, the other end of which is connected to one end of a coiled helical spring 34 which is held in a state of compression within a tubular retaining box 35. The retaining box 35 is in the form of a tube closed at one end, the other end being spun over as at 36 to retain the spring 34 and the flexible cable 33 is connected to the end of the spring nearest the closed end of the box 35. A second flexible cable 37 is connected to the closed end of the box 35 and passes round a guide block or abutment 37a on the actuating lever and over a guide pulley 38 mounted at the side of the hydraulic cylinder, its other end being connected to the boss 20a as at anchorage 39. The adjuster is arranged to respond to movement of the actuating lever on application of the brake and as this lever pivots, the cable 37 runs over the pulley 38 and causes a movement of the face pawl 28. The start of the pivotal movement of the actuating lever is determined by the clearance between the brake pads and the disc and if the movement of the cable 37 is greater than the pitch of one ratchet tooth then the nut will be rotated to adjust the clearance between the brake pads and the disc. Adjustment of the nut 25 only takes place during the free travel of the brake pads. Once the pads engage the disc the reactions of the braking forces bind the nut upon the threads of the bolt and lock the nut in position. Due to the high actuating force developed by the hydraulic cylinder and piston, resilient deflection of the actuating lever may occur after engagement of the pads and this will cause additional response of the adjuster as the cable 37 runs slightly further over the pulley 38. However since the nut 25 is locked no further adjustment can take place and in these circumstances the spring 34 acts as a resiliently yieldable force limiting means and yields resiliently when the force in the cable 37 exceeds the preloading force of the spring. This effectively increases the length of the cable from the connection 39 on the boss 20a to the flange 32 on the face pawl 28 and prevents the adjuster from being damaged or strained.

On release of the hydraulic pressure in the cylinder 19 the brake pads are retracted by the force of a coiled return spring 41 acting between the levers 12 and 13. The actuating lever 16 is returned to its rest position by the force of a tension spring 42 connected between a lug 43 on the boss 20a and a flange 44 on the cylinder 19. As the actuating lever returns to its rest position the cable 37 runs back over the pulley 38 and the spring 34 expands until it engages both ends of the retaining box 35. A return spring 45 connected between a pin 46 on the actuating lever and the flange 32 rotates the face pawl 28 in the free wheeling direction to its rest position.

What I claim is:

1. Means for adjusting friction elements of a brake comprising cooperating screw and nut members operatively connected to said elements, teeth on one of said members, a pawl cooperating with said teeth, and means for moving said pawl to effect step-by-step relative movement of said one member with respect to the other upon wear of said friction elements, said means comprising an elongated flexible and extensible assembly including first and second parts, one of said parts being a flexible inextensible cable and the other of said parts being a yielding link, means connecting said parts together at one end of each, the opposite end of one of said parts being operatively connected to said pawl, an anchorage connected to the opposite end of the other of said parts, an abutment engaging said cable intermediate the ends thereof, means for effecting relative movement between said abutment and said anchorage upon application of the brake, said abutment being constructed and arranged that said cable is tensioned over said abutment upon application of said brake to effect movement of said pawl so long as the tension in said cable is less than the force which the resiliently yielding link can transmit without yielding.

2. Means as in claim 1 wherein said resiliently yieldable link is connected between said pawl and said cable.

3. Means as in claim 1 wherein said resiliently yieldable link incorporates a pre-loaded spring.

4. Means as in claim 1 wherein said teeth are arranged in a ring on its member in a plane normal to its axis, a face pawl rotatably mounted on said member, and resilient means urging said face pawl into engagement with said ratchet teeth, said cable being connected to the face pawl through the resiliently yieldable link for moving the pawl angularly.

5. A disc brake comprising a rotatable disc, friction pads for engagement with opposite faces of said disc, first and second pivoted levers each carrying one of said friction pads, a pivoted actuating lever acting on said first lever through thrust means, a tension member engaging said second lever, a nut in screw-threaded engagement with said tension member, an operative engagement between said nut and the actuating lever, means for rotating said nut step-by-step, a cable connected between said means and a stationary anchorage and incorporating a resiliently yieldable link, and an engagement between said cable and a part of said actuating lever whereby movement of said actuating lever in the application of the brake tensions the cable to operate said means for rotating the nut and the link yields to prevent further rotation of the nut when resistance to its movement exceeds a predetermined value.

References Cited by the Examiner

UNITED STATES PATENTS

| 3,048,242 | 8/1962 | Perks | 188—73 |
| 3,050,157 | 8/1962 | Kenzik et al. | 188—79.5 |
| 3,077,246 | 2/1963 | Redmayne et al. | 188—73 |
| 3,129,789 | 4/1964 | Hodkinson | 188—196 X |

FOREIGN PATENTS

| 1,252,554 | 12/1960 | France. |
| 612,360 | 11/1948 | Great Britain. |

DUANE A. REGER, *Primary Examiner.*

ARTHUR L. LA POINT, *Examiner.*